United States Patent [19]

Datta

[11] 4,275,100
[45] Jun. 23, 1981

[54] VIDEO DISC PROCESSING

[75] Inventor: Pabitra Datta, Cranbury, N.J.

[73] Assignee: RCA Corporation, New York, N.Y.

[21] Appl. No.: 109,206

[22] Filed: Jan. 4, 1980

[51] Int. Cl.³ .............................................. B32B 3/02
[52] U.S. Cl. ..................................... 369/286; 134/42;
264/107; 264/233; 264/344; 427/299; 427/387;
427/64; 428/65; 428/447; 369/126; 369/276
[58] Field of Search ............... 427/387, 444, 299, 302;
428/447, 451, 64, 65; 252/103, 186; 346/135.1;
179/100.1 B, 100.1 G, 100.41 R; 134/42;
264/107, 232, 233, 344; 8/137, 137.5, 139

[56] References Cited
U.S. PATENT DOCUMENTS

| | | | |
|---|---|---|---|
| 2,269,267 | 1/1942 | Hunter | 264/107 |
| 2,584,892 | 2/1952 | Lord | 264/107 |
| 3,635,667 | 1/1972 | Keay et al. | 252/103 |
| 3,833,408 | 9/1974 | Matthies | 428/447 |
| 3,838,967 | 10/1974 | Shepley | 252/103 |
| 3,842,194 | 10/1974 | Clemens | 179/100.1 B |
| 4,086,178 | 4/1978 | Walker | 252/551 |
| 4,127,872 | 11/1978 | Shenlo | 179/100.1 G |
| 4,131,698 | 12/1978 | Deckert | 427/299 |

FOREIGN PATENT DOCUMENTS

| | | | |
|---|---|---|---|
| 2837601 | 4/1979 | Fed. Rep. of Germany | 346/135.1 |
| 7804651 | 3/1979 | Netherlands | 346/135.1 |

*Primary Examiner*—Ronald H. Smith
*Assistant Examiner*—S. L. Childs
*Attorney, Agent, or Firm*—Birgit E. Morris

[57] ABSTRACT

A conductive video disc replica is cleaned by washing with an aqueous solution comprising an oxidizing agent, a base and a surfactant of a fluorocarbon added in an amount so that the solution has a surface energy of about 35 dynes/cm² or less. This solution removes metallic and oxygen-containing impurities from the surface of the disc and leaves a fluorinated surface.

9 Claims, 1 Drawing Figure

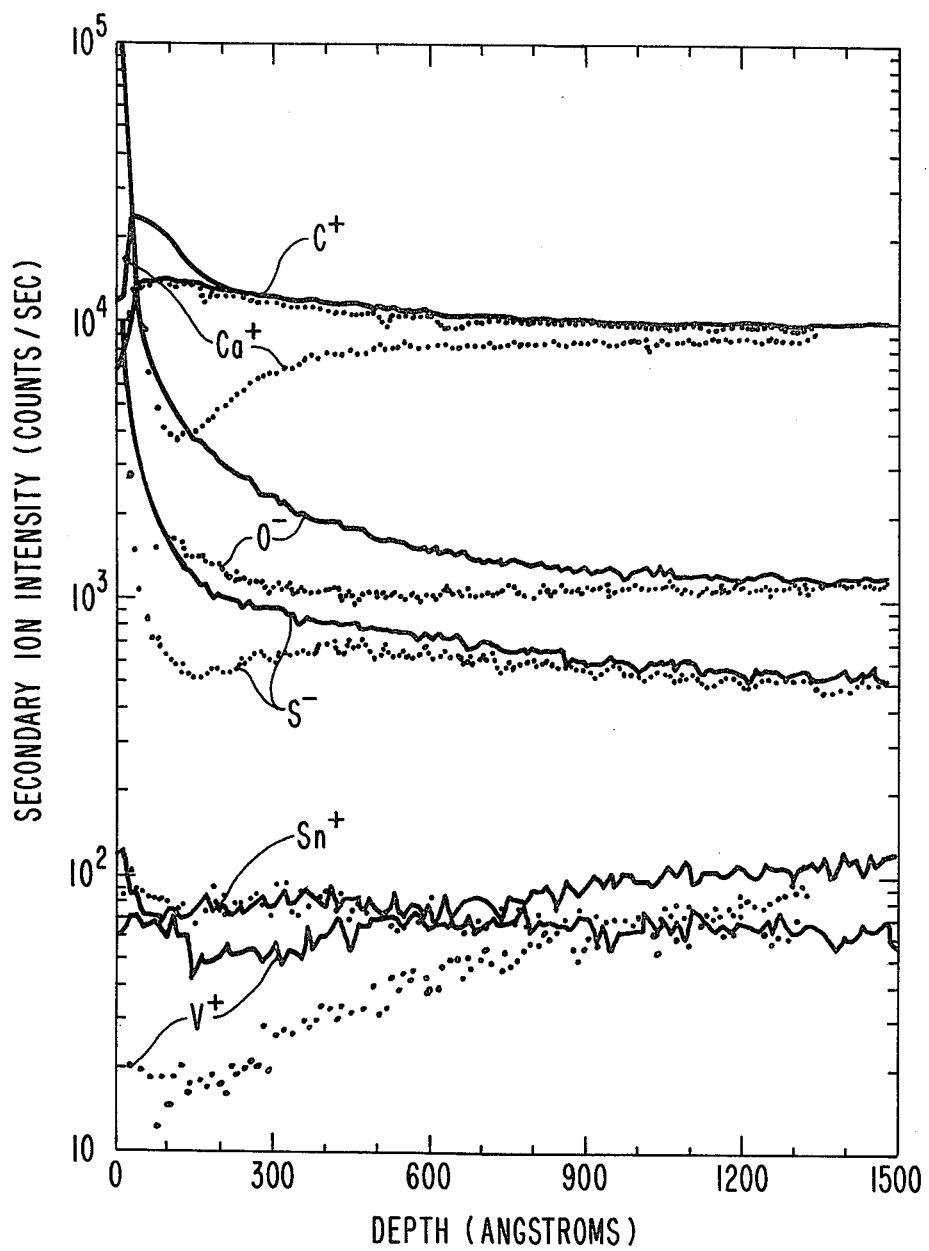

VIDEO DISC PROCESSING

This invention relates to the manufacture of high density information discs. More particularly, this invention relates to the manufacture of molded, conductive high density information disc replicas to improve their storage stability.

BACKGROUND OF THE INVENTION

A capacitance video disc system has been described by Clemens in U.S. Pat. No. 3,842,194. The disc described comprises a plastic disc containing an information track having audio, video and color information in the form of a surface relief pattern arranged in a spiral groove on the surface of the disc which can be played back with a stylus. The video disc of Clemens had a conductive metal coating to provide the conductivity required for capacitive pickup and a thin layer of a dielectric material thereover. An electrode on the playback stylus completed the capacitor. This system can also be employed to store information in any form of surface relief pattern, e.g., digital form.

Improvements have been made in this system whereby the disc is made from a conductive plastic material, as disclosed by Fox et al in copending application Ser. No. 818,279, filed July 25, 1977 now abandoned. A polyvinylchloride based molding composition is mixed with sufficient amounts of finely divided carbon black particles so that the resulting composition has the conductivity required for capacitive playback. A thin layer of the polyvinylchloride surrounds each of the conductive carbon particles so that a thin dielectric layer is present at the surface. Improvements to the conductive molding composition are described by Martin et al in copending application Ser. No. 003,363, filed Jan. 15, 1979, now U.S. Pat. No. 4,228,050.

The use of a conductive plastic eliminates the need for separate metal and dielectric layers on the disc surface and thus has simplified manufacture of the disc. However, we have found the stability of these discs with respect to environmental fluctuations of temperature and relative humidity has been less than satisfactory. Discs which on initial playback have excellent playback characteristics, deteriorate with respect to playback after storage under ambient conditions. This deterioration is particularly marked when the discs are exposed to high temperature, high relative humidity conditions.

Huck et al in a copending application entitled "Video Disc Processing", filed Nov. 7, 1979, Ser. No. 091,878, have disclosed that video discs that have been cleaned with an aqueous solution have improved stability of playback characteristics to changing environmental conditions. Water alone or dilute solutions of acids or bases remove metal salts and organic materials on the surface of the disc which contribute to moisture sensitivity of the disc.

SUMMARY OF THE INVENTION

I have found that particular improved aqueous cleaning solutions comprising an oxidizing agent, a base and a sufficient amount of a fluorosurfactant which will produce a solution having a surface tension below about 35 dynes/cm$^2$ are excellent cleaning solutions for high density information discs that will remove contaminants on the disc surface that contribute to water sensitivity.

BRIEF DESCRIPTION OF THE DRAWING

The FIGURE is a graph of ion concentration as a function of depth as determined by SIMS for treated and untreated discs.

DETAILED DESCRIPTION OF THE INVENTION

The high density information discs treated according to the present invention are molded from a molding composition comprising: a polymer of vinyl chloride; finely divided conductive carbon black particles; a stabilizer system, generally a mixture of tin salts that scavenge or take up hydrochloric acid formed as a decomposition product of the vinyl chloride polymer during processing; a lubricant system, generally composed of both an internal lubricant to modify the melt viscosity of the molding composition during processing, and an external lubricant to provide release of the molded article, hereinafter referred to as a video disc, from the mold; and a flow modifier system, generally composed of plasticizers and processing aids, which reduces the melt viscosity of the molding composition during processing.

When large amounts of carbon black are present in a molding composition, the melt viscosity greatly increases, necessitating higher molding temperatures or larger amounts of plasticizers and processing aids. Since the present carbon-loaded polyvinylchloride molding compositions employed for the video disc contain about 12 up to 20 percent by weight of carbon black or even higher, depending on the type of carbon black used and the dispersion obtainable, several processing aids and plasticizers must be added to obtain the melt flow properties required to compression mold the information disc, which contains information as very small surface relief patterns in a very shallow information track. Sufficient lubricants must be added to promote ready release of the molded article from the mold because any release problems will result in distortion of the record during forced release, and even distortion of the stamper from which it is molded, which ruins all succeeding discs made from the stamper.

The polyvinylchloride (PVC) resins suitable for manufacture of the video discs include polymers and copolymers of vinyl chloride and mixtures thereof. In order to produce desired characteristics in the molded video discs, such as dimensional stability, the PVC resin should have a high heat distortion temperature, preferably 140° F. (60° C.) or higher. Suitable polymers include homopolymers of vinyl chloride such as No. 346 resin of the B. F. Goodrich Company which has a $T_g$ of 88° C, or a vinyl chloride-polypropylene copolymer known as AP480 from Air Products & Chemicals, Inc., which has a $T_g$ of 76° C. Other polyvinylchloride homopolymers such as Great American Chemical Company's 550 resin and Air Product's 2160 resin can also be employed.

Conductive particles suitable for use in the molding composition include highly electrically conductive, finely divided carbon blacks, preferably which have a low bulk density to reduce loading requirements. Presently, preferred is a product of the Armak Company, Ketjenblack EC, which has an apparent bulk density of about 140–160 grams per liter and an average particle size of about 300 angstroms. Other carbon blacks can also be employed, in whole or in part, provided they meet the electrical requirements. Denser particles of carbon will generally require higher loading, e.g., up to about 35–40 percent by weight of the molding composition, to obtain an equivalent electrical conductivity. An amount of from 12–20 percent by weight of a carbon black such as Ketjenblack EC is preferred.

From about 1.5–4 percent by weight of stabilizers are added to the chosen PVC-carbon black composition. Suitable stabilizers include organotin compounds such as dibutyltin-β-mercaptopropionate, commercially available as T-35 from M & T Chemical Company, Inc., dibutyltin maleate, commercially available as Mark 275 from Argus Chemical Company and stabilizers such as barium-cadmium-lead stearate, commercially available as Q-232B of Argus Chemical Company. Other stabilizers are well known. Stabilizers act primarily to scavenge volatile decomposition products of the PVC resin, particularly hydrogen chloride. Preferably, a combination of more than one stabilizer in a particular molding composition is employed.

Suitable lubricants for PVC resins are well known and include fatty acids and esters of alcohols and fatty acids, soaps, fatty acid amides and the like. At least two lubricants should be employed, again, to prevent excessive bleed out of the lubricant during the molding process and to provide both internal and external lubrication. Suitable lubricants include a mixture of a monofatty acid ester of varying molecular weight alcohols and acids commercially available as Loxiol's G-30 from Henkel International GmbH, Loxiol G-70, a polyfunctional complex ester of saturated fatty acids, a room temperature solid esterified montan wax commercially available as Wax E of the Hoechst Company, calcium, zinc or lead stearates, stearic amide, oleamide, ethylene bis stearamides, low molecular weight paraffin oils such as Olio de Vasilina from Carlo ERBA, a division of Chemica Industrialle, Milan, and the like. Sufficient lubricants must be added to prevent high shear heating during processing and to provide good release from the mold. Generally from about 1 to 3 percent by weight of the molding composition of a lubricant system will be used.

Additional modifiers including plasticizers and processing aids in amounts up to about 10 percent by weight of the resin composition are also added to improve the processing and molding characteristics of the resin composition. Suitable plasticizers include products such as chlorinated paraffin waxes, for example Unichlor 70AX from Neville Chemical Company, glyceryl tribenzoate, commercially available as Benzoflex S-404 from Velsichol Chemical Corporation, epoxidized soybean oils, commercially available as Paraflex G-62 from Rohm & Haas Company, Santicizer 711, a primary phthalate plasticizer of the Monsanto Company, Kodaflex NP10, a polymeric ester plasticizer from Eastman Chemical Products, dicyclohexylphthalate and various processing aids such as acrylic modifiers of Rohm & Haas Company commercially available as K-147 and K-175. Other modifiers are well known.

Video disc replicas are made by mixing the molding composition first as a dry blend and then heating to melt temperatures and extruding and pelletizing for storage. The discs are then compression molded in conventional manner, e.g., forming a preform and compression molding using a 30–60 second cycle at about 325°–380° F. (163°–190° C.) and removing the flashing.

A thin lubricant coating is usually added to the video disc. This film serves as an added dielectric layer at the surface and also serves to reduce stylus wear during playback of the disc. One lubricant type that has been employed successfully is a methylalkylsiloxane of the formula

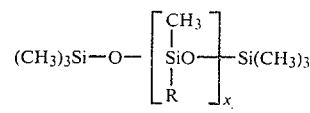

wherein R is an alkyl group of 4–20 carbon atoms and x is an integer. These lubricants can be applied by spinning or spraying from solution or evaporating onto the disc surface. An improved lubricant is a purified fractionated lubricant of the above type wherein R is 10 and x ranges from about 2–3. The purified lubricant can be made by molecular distillation of the higher molecular weight material. The lubricant and method of manufacture are described by Wang et al. in their copending applications, Ser. Nos. 065,064 and 065,065, filed Aug. 9, 1979.

During compression molding of the video disc, many of the above additives, or reaction products of these additives including decomposition products or reaction products of the additives with the PVC or with each other, migrate to the surface of the disc where they form a thin film. This thin film is a complex mixture of various organic and inorganic materials. It is this thin film which is moisture sensitive and causes playback problems for the video disc.

When a video disc as pressed is exposed to moisture in the atmosphere, small droplets of water condense on the surface of the disc. Any salts or other water soluble materials that are present on the surface of the disc, whether under or adjacent to the water droplets, are dissolved by the water droplets. These water droplets may also dissolve water soluble materials below the surface of the disc, as by a wicking or leaching effect. When the water evaporates, the salts are left on the surface of the disc, now not as a uniform thin film, but as lumps or deposits. These deposits may be many grooves wide and they fill up the grooves beneath them as well. Thus the information present in the groove beneath the deposits is masked or lost during playback by the stylus, which rides over the deposits resulting in a loss of signal or dropouts in that area. Additional signal losses occur because the stylus may dislodge some of these deposits during playback, and they collect beneath or in front of the stylus which results in further distortion or losses of signal. The present standard for such loss of signal, or dropouts, for acceptable video discs is about 2–3 seconds in one hour of playback time.

The rinse solution of the invention includes an oxidizing agent to oxidize the surface esters and form their corresponding organic acids. Suitably hydrogen peroxide can be employed. The organic acids can be most readily removed by then reacting them with a base to solubilize them, such as an alkali metal hydroxide, e.g., sodium hydroxide, or ammonium hydroxide. The base also serves to remove deliquescent inorganic salts such as calcium chloride and tin tetrachloride from the surface of the disc.

A fluorocarbon surfactant is also present in an amount which will provide good wetting of the irregularly shaped disc surface. A fluorocarbon surfactant is chosen because of its inertness and stability in an oxidizing environment. An amount which will reduce the surface tension of the cleaning solution to about 35 dynes/cm$^2$ or less will uniformly and rapidly wet the entire surface of the disc.

Anionic fluorocarbon surfactants are preferred because they will best remove cationic impurities such as Ca$^{+2}$, Pb$^{+4}$, Ba$^{+2}$, VO$_2^+$ and the like. However, non-ionic and amphoteric surfactants can also be employed. Cationic surfactants are less desirable since they do not remove cationic impurities for the present application and may tend to leave residual contaminants on the disc surface. Ammonium salts of anionic surfactants are preferred over their sodium or potassium counterparts, which may leave residual sodium or potassium ions on the cleaned disc surface, thereby creating some additional water sensitive sites. Another criteria for choice of the fluorosurfactant is foaming—a low foaming surfactant is preferred. Good choices for a fluorosurfactant are anionic, nonionic or amphoteric products such as FC-93, an anionic ammonium perfluoroalkyl sulfamate, or FC-171, a nonionic fluorinated alkyl polyoxyethylene ethanol, both available from the 3M Company, or FSN, a nonionic, or FSB, an amphoteric, surfactant available from the DuPont de Nemours and Company under their trademark "ZONYL".

The discs can be cleaned by immersing in the cleaning solution, or by spraying and the like. The solution can be agitated to improve the cleaning action, as by mechanical stirring or ultrasonic agitation and the like. A scrubbing action can also be directed at the surface of the disc if desired, to aid in the cleaning action. Multiple immersion can be employed and a final rinse with purified water can also be beneficially employed. After cleaning, the discs may be air dried. A preferred cleaning method comprises directing jets of spray of the cleaning solution at the surfaces of the disc for about 1–5 minutes, immersing the discs in clean water and slowly withdrawing the discs to avoid the formation of water droplets on the surface, and air drying.

Analyses of the film on the disc surface and of the disc surface after cleaning reveal that metal salts including calcium, barium, lead, nickel and tin, sulphur compounds and organic compounds such as esters are originally present and are removed from the disc surface by the present cleaning solution.

The invention will be further described in the following Examples, but it is to be understood that the invention is not meant to be limited to the details described therein. In the examples parts and percentages are by weight unless otherwise noted.

EXAMPLE 1

A solution was prepared by mixing 500 parts of 30 percent hydrogen peroxide, 500 parts of ammonium hydroxide (36 percent) and 7 parts by volume of a fluorosurfactant commercially available as Fluorad FC-93, an anionic, ammonium perfluoroalkylsulfonate, in 10,000 parts of water. The solution was charged to an ultrasonic cleaning tank.

Video discs that were compression molded from a molding composition containing 75.15 parts of PVC resin 346 referred to above, 14.8 parts of Ketjenblack EC carbon particles, 1.5 parts of T35 and 1.0 part of Mark 275 stabilizers, 0.75 part of G-30, 0.25 part of G-70, 0.5 part of calcium stearate, and 0.3 part of Olio di Vasilina lubricants, 0.75 part of K-175 processing aid, 2.0 parts of K-147 processing aid and 3.0 parts of Santicizer 711 modifier.

Video discs were compression molded at about 360° F. (182.2° C.). Three discs each from the same press run and from two different stampers were mounted in the ultrasonic tank and revolved at 56 rpm for 15 minutes. The discs were then raised with deionized water for 10 minutes and dried under nitrogen.

A lubricant layer was then applied as a 1 percent solution in heptane of a lubricant of the formula

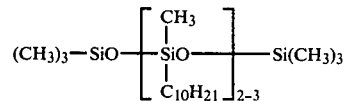

made according to the method described by Wang et al. in the copending applications referred to above.

A control group of three unrinsed discs from the same press run and from each of the same stampers as above was also lubricated.

Carrier distress time was measured on initial playback of the discs. The discs were then exposed to environmental stress testing as follows: the discs were stored in a refrigerator at 40° F. (4.4° C.) for two hours and removed to a room temperature chamber maintained at 70° F. (21.1° C.) and 50 percent relative humidity (hereinafter ambient temperature) and maintained for two hours. The discs were played and the carrier distress time measured. The cold condensation stress test was then repeated. The results are summarized below in Table I.

TABLE I

| | Carrier Distress Time, secs. | | |
|---|---|---|---|
| | Initial Play | After Stress 1 | After Stress 2 |
| Rinsed Discs | | | |
| Stamper A | 16.4 | 1.7 | 0.2 |
| Stamper A | 7.9 | 19.6 | 0.9 |
| Stamper A | 266.7 | 88.0 | 1.5 |
| Stamper B | 95.2 | 5.2 | 0.3 |
| Stamper B | 27.1 | 3.9 | 0.2 |
| Stamper B | 26.1 | 9.4 | 0.5 |
| Unrinsed Discs Controls | | | |
| Stamper A | 440.4 | 1164.7 | 832.2 |
| Stamper A | 742.7 | 856.3 | 608.3 |
| Stamper A | 693.2 | 1241.2 | 713.4 |
| Stamper B | 123.2 | 892.1 | 593.0 |
| Stamper B | 424.0 | 1313.3 | 886.1 |
| Stamper B | 580.0 | 1201.5 | 204.6 |

It is apparent that rinsing the discs improved their playback performance.

A visual test was also conducted by placing a drop of water on the disc surface and evaporating it. The untreated discs were left with a white salt-like stain where the water drop had been evaporated. The cleaned discs showed no stains.

A sample from the inner, non-grooved portion of a cleaned but unlubricated disc prepared as above was examined by secondary ion mass spectrometry (SIMS). The FIGURE is a graph of the ion concentration as a function of depth for $^{12}$C$^+$, $^{40}$Ca$^+$, $^{120}$Sn$^+$, $^{51}$V$^+$, $^{32}$S$^-$ and $^{16}$O$^-$ with an unrinsed sample as a control. The solid lines represent the unrinsed samples and the dotted lines represent the rinsed samples. It is apparent that Ca$^+$, O$^-$, S$^-$, Sn$^+$, and V$^+$ have been depleted from the disc surface in the rinsed disc as compared to the unrinsed disc to varying depths of 300–1000 angstroms.

CONTROL A

An acidic solution was made containing 1 percent of nitric acid, 1 percent of perchloric acid and 0.5 percent of FC-95 surfactant in deionized water. The solution wet a video disc well. A video disc as in Example 1 was cleaned with this solution and dried. One drop of water was placed on the disc surface and evaporated. A white spot formed on the disc after evaporation of the water drop.

CONTROL B

A solution was made which did not contain an oxidizing agent comprising 10 percent sodium hydroxide and 1 percent of FC-95 surfactant.

After rinsing with this solution following the procedure of Example 1, a drop of water was applied to the disc surface. A white spot appeared after evaporation of the water drop.

EXAMPLES 2,3

Discs were pressed as in Example 1, except employing different molding compositions.

A composition of Example 2 was made from 75.0 parts of PVC 346 resin, 15.0 parts of Ketjenblack EC carbon particles, 1.5 parts of T-35 stabilizer, 1.0 part of Mark 275 stabilizer, 0.5 part of G-30 lubricant, 0.25 part of G-70 lubricant, 2 parts of K-147 processing aid and 3.0 parts of diundecyl phthalate processing aid.

The composition of Example 3 was made from 74.75 parts of PVC resin 346, 15.0 parts of Ketjenblack EC carbon black, 2.0 parts of Mark 275 stabilizer, 0.75 part of Q-232B stabilizer, 0.5 part of G-30 lubricant, 0.35 part of G-70 lubricant and 4 parts of G-62 modifier.

Discs, as pressed and cleaned following the procedure of Example 1, were analyzed by X-ray Photoelectric Spectroscopy to determine changes in composition before and after cleaning. The results are summarized below in Table II.

TABLE II

| Disc | Elemental Analysis, % | | | | |
|---|---|---|---|---|---|
| | C | O | Na | Sn | F |
| Example 2, | | | | | |
| as pressed | 67.0 | 7.4 | 3.6 | — | — |
| cleaned | 73.5 | 6.7 | 2.0 | — | 1.6 |
| Example 3, | | | | | |
| as pressed | 68.3 | 8.5 | 2.7 | 0.4 | — |
| cleaned | 64.5 | 7.7 | 2.8 | — | 3.7 |

It is apparent that the cleaning solution of the invention reduces the amount of oxygen on the surface of the discs and reduces the amount of metal salts such as tin. In addition, the cleaned discs now have fluorine atoms or sites on their surface.

EXAMPLE 4

The surface energy of a disc cleaned as in Example 1 was determined by measuring contact angles of drops of a variety of solvents whose surface tension is known. The data are summarized in Table III below, wherein the dispersive contribution to critical surface energy is designated as $\gamma_s^d$ dynes/cm; and the polar contribution is designated as $\gamma_s^p$ dynes/cm, which were calculated for the observed values of contact angle using the Koelhe-Good-Girifaclo-Fawkes geometric means approximation in known manner. An as pressed disc was employed as Control 1 and a disc cleaned with a solution (5 percent aqueous solution) of Shipley 1160 conditioner available from the Shipley Company, was employed as Control II.

TABLE III

| Contact Angle | Disc | | |
|---|---|---|---|
| | Control I | Control II | Example 1 |
| Water | 80 | 72 | 98 |
| Glycerol | 42 | 30 | 65 |
| $CH_2I_2$ | 25 | 28 | 32 |
| Hexadecane | 8 | 8 | 15 |
| Decahydro-naphthalene | 13 | 15 | 20 |
| $\gamma_s^d$ | 31 | 30 | 28 |
| $\gamma_s^p$ | 5.0 | 8.5 | 1.0 |

Treatment with the cleaning solution of the present invention reduced the polar component of the critical surface energy, indicating less moisture sensitivity of the discs cleaned according to the invention.

I claim:

1. In the manufacture of an information record having information in the form of geometric variations in an information track which can be reconstituted in signal form with a playback stylus wherein a conductive plastic is compression molded to form said record and the surface of said record is cleaned with an aqueous solution, the improvement which comprises cleaning with an aqueous solution comprising an oxidizing agent, a base and sufficient amount of a fluorosurfactant so that the solution has a surface energy of about 35 dynes/cm² or less.

2. A process according to claim 1 wherein a lubricant is applied to the cleaned surface.

3. A process according to claim 2 wherein said lubricant has the formula

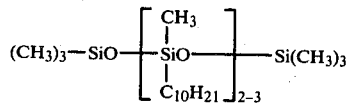

4. A process according to claim 1 wherein said aqueous solution comprises hydrogen peroxide, ammonium hydroxide and an anionic fluorocarbon.

5. In a method of fabricating a high density information disc replica which comprises dry blending a polyvinylchloride resin with additives including stabilizers, lubricants and flow modifiers, compression molding to form a disc replica having water soluble salts on its surface and cleaning the disc replica with a water based solution to remove the water soluble salts from the surface of the disc, the improvement which comprises employing as said solution an aqueous solution comprising an oxidizing agent, a base and a sufficient amount of a fluorosurfactant so that the solution has a surface energy of about 35 dynes/cm² or less.

6. A method according to claim 5 wherein said additives include at least 12 percent by weight of the molding composition of conductive carbon black particles.

7. A process according to claim 5 wherein a lubricant layer is applied to the cleaned disc surface.

8. A process according to claim 7 wherein said lubricant has the formula

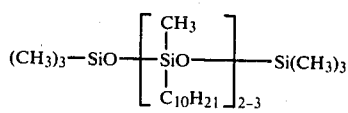

9. A video disc as prepared by the method of claim 5 having a fluorinated surface.

* * * * *